(12) United States Patent
Pionkowski (10) Patent No.: US 10,175,844 B2
(45) Date of Patent: Jan. 8, 2019

(54) INTERFACE ENVIRONMENT FOR CAPTURING AND STORING INFORMATION IN A DOCUMENT

(71) Applicant: Ricky Steven Pionkowski, Colorado Springs, CO (US)

(72) Inventor: Ricky Steven Pionkowski, Colorado Springs, CO (US)

(*) Notice: Subject to any disclaimer, the term of this patent is extended or adjusted under 35 U.S.C. 154(b) by 731 days.

(21) Appl. No.: 14/423,497

(22) PCT Filed: Aug. 23, 2013

(86) PCT No.: PCT/US2013/056364
§ 371 (c)(1),
(2) Date: Feb. 24, 2015

(87) PCT Pub. No.: WO2014/031945
PCT Pub. Date: Feb. 27, 2014

(65) Prior Publication Data
US 2017/0322654 A1 Nov. 9, 2017

Related U.S. Application Data

(60) Provisional application No. 61/692,824, filed on Aug. 24, 2012.

(51) Int. Cl.
*G06F 3/048* (2013.01)
*G06F 17/30* (2006.01)
*G06F 17/21* (2006.01)

(52) U.S. Cl.
CPC ........ *G06F 3/048* (2013.01); *G06F 17/30011* (2013.01); *G06F 17/30528* (2013.01); *G06F 17/30607* (2013.01); *G06F 17/212* (2013.01)

(58) Field of Classification Search
CPC ............... G06F 3/04817; G06F 3/0482; G06F 17/2785; G06F 17/28; G06N 99/005
See application file for complete search history.

(56) References Cited

U.S. PATENT DOCUMENTS

| 5,077,666 A | 12/1991 | Brimm et al. |
| 6,289,316 B1 | 9/2001 | Aghili et al. |

(Continued)

FOREIGN PATENT DOCUMENTS

| EP | 0481995 | 5/1997 |
| WO | WO 2014/031945 | 2/2014 |

OTHER PUBLICATIONS

Notification of Transmittal of the International Search Report and the Written Opinion of the International Searching Authroity, or the Declaration of International (PCT) Application No. PCT/US13/56364, dated Mar. 6, 2014, 10 pages.

(Continued)

*Primary Examiner* — Claudia Dragoescu
(74) *Attorney, Agent, or Firm* — Aspire IP, LLC; Yiu F. Au (57) ABSTRACT

An interface environment captures and stores complex and variable data from a user in a rapid, robust, adaptable, and structured manner. The interface environment includes a display of a document, and the document includes one or more contextual objects. Each contextual object is responsive to an input of a user changing the content of the contextual object, and adds or removes from the document one or more contextual objects. The one or more contextual objects are added or removed in accordance with the content of the contextual object mapped to a definition in a domain specific knowledge for the document and in response to external applications monitoring the contextual objects. The interface environment is applicable to all types of domains including healthcare, point-of-sale, legal, financial, and other services. The document and the contextual objects are saved to a database and accessible by other external applications.

22 Claims, 10 Drawing Sheets

(56) References Cited

U.S. PATENT DOCUMENTS

| | | |
|---|---|---|
| 7,334,194 B2 | 2/2008 | Hattori et al. |
| 7,603,633 B2 | 10/2009 | Zhao et al. |
| 2006/0161864 A1 | 7/2006 | Windl |
| 2007/0061716 A1 | 3/2007 | Kato |
| 2010/0280821 A1 | 11/2010 | Tiitola |
| 2011/0209094 A1 | 8/2011 | Gasn et al. |
| 2011/0302189 A1 | 12/2011 | Liu et al. |
| 2012/0191716 A1 | 7/2012 | Omoigui |
| 2012/0200507 A1* | 8/2012 | Flam .................. G06F 19/322 345/173 |

OTHER PUBLICATIONS

International Preliminary Report on Patentability of International (PCT) Application No. PCT/US13/56364, dated Feb. 24, 2015, 7 pages.

* cited by examiner

Fig. 1

Patient: James, Harry W   Created: Thu Aug 23, 2013 12:51:30 GMT-0600 (MDT)   Location: Unknown Location
Provider: Bommer, Tommy Completed: --

Note:
CC:
   chest pain ⌒ 210

Hx:   250a ⌒   240a ⌒   220 ⌒   230a ⌒
   The patient complains of new intermittent chest pain for 1 day.]   Denies nausea.   Denies sweating.

ROS:
   Denies abdominal pain.   Denies syncope.   Denies rectal pain.   Denies jaundice.

PMH:
   never Diabest Mellitus.   Never Hypertension.   Never Myocardial Infarction.   Never Angino Pectoris.   Never Hypercholesterolemia.

PE:
   General:   Appearance:   distress absent.
   Heart:   Sounds:   S1 normal intensity.   S2 normal intensity.   Murmur absent.   Inspection:   JVD absent.
   Lungs:   breath sounds.   Skin:   ankle edema R absent, L absent.

Dx:
   Chest Pain.
   Myocardial Infarction.

Actions:
   8/23 11:22 Dr. Jones:  iv insertion  8/23 12:52  S. Smith RN ( Save Note )   ( Note is Completed )
 241a              241b

*Fig. 2A*

Note:
CC:
  chest pain
Hx:
  The patient complains of new in | Unknown | 1 day.  Denies nausea.  Denies sweating.
                                   | Constant |
                                   | Intermittent |
                                   | Waxing and waning |
  ⌐240a
ROS:
  Denies abdominal pain.  Denies syncope.  Denies rectal pain.  Denies jaundice.
PMH:

*Fig. 2B*

Note:
CC:
  chest pain
Hx:
  The patient complains of new constant chest pain for 1 day.  Denies nausea.  Denies sweating.
  ⌐240b
ROS:
  Denies abdominal pain.  Denies syncope.  Denies rectal pain.  Denies jaundice.
PMH:

Note:
CC:
  chest pain

⌠ 250a

Hx:
The patient complains of | chest pain for 1 day. Denies nausea. Denies sweating.
| Unknown |
| New |
| Recurrent |

ROS:
Denies abdominal pain. Denies syncope. Denies rectal pain. Denies jaundice.

PMH:

*Fig. 2D*

Note:
CC:
  chest pain

⌠ 250b

Hx:
The patient complains of new constant chest pain for 1 day. Denies nausea. Denies sweating.

ROS:
Denies abdominal pain. Denies syncope. Denies rectal pain. Denies jaundice.

PMH:

*Fig. 2E*

Note:
CC:
  chest pain

Hx:
  The patient complains of constant chest pain for 1 day. Denies *nausea*. Denies *sweating*. ⌒230b

ROS:
  *Denies abdominal pain. Denies syncope. Denies rectal pain. Denies jaundice.*

PMH:

*Fig. 2F*

Note:
CC:
  chest pain ⌐ 310

Hx:
  The patient complains of the ONSET onset of AGE QUALITY constant CHANGE chest pain of SEVERITY severity for 1 day. Initially, the pain was LOCATION. The pain is now LOCATION. Denies nausea. Denies sweating. ⌐ 330  It is worsened by WORSENS. It is lessened by LESSENS. It radiates to RADIATION.

ROS:
  *Denies abdominal pain. Denies syncope. Denies rectal pain. Denies jaundice.*

*Fig. 3A*

Note:
CC:
  chest pain

Hx:
  The patient complains of the ONSET onset of recurr... ⌐NGE chest pain of SEVERITY severity for 1 day. Initially, the pain was LOCATION. The pain is now ...ned by WORSENS. It is lessened by LESSENS. It radiates to RADIATION. Denies nausea. Denies ...

⌐ 340

| QUALITY |
|---|
| Sharp |
| Burning |
| Heavy |
| Achy |
| Cramp |
| OK |

ROS:
  *Denies abdominal pain. Denies syncope. Denies r...ice.*

PMH:
  *never Diabest Mellitus. Never Hypertension. Never... Never Angino Pectoris. Never Hypercholesterolemia.*

PE:
  General:   Appearance:   *distress absent.*

Note:
CC:
   chest pain ⌐ 410

Hx:
   The patient complains of recurrent heavy, achy constant chest pain of 7/10 severity for 1 day. Denies nausea. Denies sweating.

ROS:
   *Denies abdominal pain. Denies syncope. Denies rectal pain. Denies jaundice.*

Hx:
   The patient complains of recurrent heavy, achy constant chest pain of 7/10 severity for _____ . Denies

| Unknown |
|---------|
| Seconds |
| Minutes |
| Hours |
| Days |
| Weeks |
| Months |
| Years |

⌐ 421 sweating.

ROS:
   *Denies abdominal pain. Denies syncope. Denies rectal pain. Denies jaundice.*

PMH:
   *never Diabest Mellitus. Never Hypertension. Never Myocardial Infarction. Never Angi*—

| | Reset |
|---|---|
| | 1 |
| | 1-2 |
| | 2 |
| | 3 |
| | 3-4 |
| | 4 |
| | 5 |
| | 6 |
| | 7 |

*erolemia.*

⌐ 422

PE:
   General:   Appearance:   *distress absent.*
   Heart: Sounds: *S1 normal intensity. S2 normal intensity. Murmur absent.* Inspection: JVD a
   Lungs: *breath sounds.* Skin: *ankle edema R absent, L absent.*

Dx:
   *Chest Pain.*
   *Myocardial Infarction.*

Actions:
   *8/23 11:22 Dr. Jones: iv insertion 8/23 12:52 S. Smith RN*

Note:
CC:
   chest pain

Hx:
   The patient complains of the gradual onset of new QUALITY CONSTANCY CHANGE chest pain of SEVERITY for DURATION. Initially, the pain was LOCATION. The pain is now LOCATION. It is wo⎡ It is Lessened by LESSENS. It radiates to LOCATION. Denies nausea. Denies sweating.

| RADIATION |
|---|
| Nowhere |
| Chest |
| Jaw |
| Neck |
| Arm |
| Shoulders |
| Mid back |
| Lower back |
| OK |

490

ROS:
   Denies abdominal pain. Denies syncope. Denies rectal pain. Denie⎦

PMH:
   never Diabest Mellitus. Never Hypertension. Never Myocardial Infa⎦ ctoris. Never Hypercholesterolemia.

PE:
   General: Appearance: distress absent.
   Heart: Sounds: S1 normal intensity. S2 normal intensity. ⎦ nspection: JVD absent.
   Lungs: breath sounds. Skin: ankle edema R absent, L abse⎦

Dx:
   Chest Pain.
   Myocardial Infarction.

Actions:
   8/23 11:22 Dr. Jones: iv insertion 8/23 12:52 S. Smith RN

Note:
CC:
    chest pain ⌒ 510

Hx:
    The patient complains of recurrent heavy, achy constant chest pain of 7/10 severity for 3 days.
    sweating.

| | 520a |
|---|---|
| The patent complains of | |
| The patient reports | |
| Denies | |

*Fig. 5A*

Hx:
    The patient complains of recurrent heavy, achy constant chest pain of 7/10 severity for 3 days. The patient reports nausea.
    Denies sweating. The patient reports abdominal pain. ⌐Denies fever. Denies vomiting. Denies diarrhea.⌐ ⌒ 520b
    510                                                                                     530

ROS:
    *Denies abdominal pain. Denies syncope. Denies rectal pain. Denies jaundice.*

PMH:
    *never Diabest Mellitus. Never Hypertension. Never Myocardial Infarction. Never Angino Pectoris. Never hypercholesterolemia.*

PE:
General:    Appearance:    *distress absent.*
Heart:    Sounds:    *S1 normal intensity. S2 normal intensity. Murmur absent.*    Inspection:    *JVD absent.*
        *breath sounds.*    ⌐Abdomen:    *Abdominal tenerness agsent. Bowel sounds present. Rebound tenderness absent.*⌐
Lungs:
Skin:    *ankle edema R absent, L absent.*    540

*Fig. 5B*

Bill To: C1007
ABC Company
123 Big Forest Valley
Ottawa, On Z12345
Canada

Ship To:
SH Name 1
SH Address 1
SH CityState 1 SHZ12345
USA

| P.O. # | Sales Rep. Name | Ship Date | Ship Via | Terms | Due Date |
|---|---|---|---|---|---|
| O20061205 | Sales1 | 11/17/2006 | UPS | Net 7 | |

| Product ID | Description | Quantity | Unit Price | Line Total |
|---|---|---|---|---|
| PN02132 | 1 Smith Garden Hose 25 ft reinforced | | | $37.50 |
| PN00234 | 1 *Wisekoff Spray Nozzle* brass | | | $28.95 |
| PN00567 | 1 *Bon-Fire Nozzle* plastic | | | $19.95 |
| PN00343 | 1 *Smith Hose Reel* standard | | | $41.94 |

*Fig. 6*

INTERFACE ENVIRONMENT FOR CAPTURING AND STORING INFORMATION IN A DOCUMENT

CROSS REFERENCE TO RELATED APPLICATION

This application is a national stage application, under 35 U.S.C. § 371, of International Application No. PCT/US2013/056364 having an international filing date of 23 Aug. 2013, which designated the United States, which claims the benefits of and priority, under 35 U.S.C. § 119(e) to U.S. Provisional Application Serial No. 61/692,824 filed Aug. 24, 2012, each of the above-identified applications are being fully incorporated herein by reference.

BACKGROUND

This invention relates generally to a user interface environment and specifically to capturing and storing complex information in a structured and meaningful manner.

There are many domains where it is highly desirable to capture very complex and detailed information in a database. However, there is a direct correlation between the complexity of the data and the time required to enter that data. Interface design is important in any situation, but it becomes increasingly important for users who are highly paid individuals and thus whose time is extremely valuable.

SUMMARY

There is a need for an interface environment to rapidly capture and store complex and variable data from a user in a robust, adaptable, and structured manner. These and other needs are addressed by the various aspects, embodiments, and/or configurations of the present disclosure. Also, while the disclosure is presented in terms of exemplary embodiments, it should be appreciated that individual aspects of the disclosure can be separately claimed.

According to an embodiment, an interface environment on a display includes a document, the document includes one or more contextual objects, each contextual object, responsive to an input of a user changing a content of the contextual object, adds to or removes from the document one or more contextual objects in accordance with the content of the contextual object mapped to a definition in a domain specific knowledge for the document. The document further includes a means for saving the document or the contextual objects to a database. The means for saving the document or the contextual objects to the database includes one or more buttons configured to be activated by the user. At least one of the contextual objects is unacknowledged, and the unacknowledged contextual object is acknowledged responsive to an input of the user. The document further includes one or more expanded objects describing the domain specific knowledge for at least one contextual object and other related contextual objects. The expanded object is displayed on the document responsive to an input of the user on the contextual object. Responsive to the user changing a content of the expanded objects, the content of the related contextual objects or the definitions in the domain specific knowledge mapped by the related contextual objects are changed. The content of the context object includes two or more selectable contents defined in and mapped to the domain specific knowledge. The content of the context object excludes one or more selectable contents defined in the domain specific knowledge based on the selection of one selectable content defined in and mapped to the domain specific knowledge. The content of one or more contextual objects includes one or more hierarchical levels, and the changed content of one level affects the mapped contents to the domain specific knowledge of one or more other levels. The saved document or the saved contextual objects in the database are configured to be accessed by a plurality of external applications.

According to an embodiment, a contextual phrase on a document within an interface environment includes one or more words defined in a domain specific knowledge for the document, wherein the contextual phrase, responsive to an input of a user changing a content of the contextual object, adds to or removes from the document one or more contextual phrases to the document in accordance with the content of the contextual phrase mapped to a relational definition in the domain specific knowledge for the contextual phrase and the one or more contextual phrases.

According to an embodiment, a method of capturing information in an interface environment includes displaying a plurality of contextual objects within a document on a display, each contextual object is mapped to a definition in a domain specific knowledge, responsive to an input of a user changing the content of the contextual object, adding to and removing from the document one or more contextual objects in accordance with the content of the contextual object mapped to a relational definition in the domain specific knowledge for the contextual phrase and the one or more contextual phrases, the content of the contextual object is in accordance with a plurality of selectable contents defined in the domain specific knowledge for the contextual object, and saving the document or the contextual objects to a database.

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "display," as used herein, refers to a physical structure that includes one or more hardware components that provide the device with the ability to render a user interface and/or receive user input. A display can encompass any combination of a gesture capture region, a touch sensitive display, and/or a configurable area. The device can have one or more physical displays embedded in the hardware. However, a display may also include an external peripheral device that may be attached and detached from the device. In embodiments, multiple external devices may be attached to the device.

The term "media" of "multimedia," as used herein, refers to content that may assume one of a combination of different content forms. Multimedia can include one or more of, but is not limited to, text, audio, still images, animation, video, or interactivity content forms.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

The term "touch screen" or "touchscreen" refers to a screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores an electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of the interface environment and systems and methods of using the interface environment. Embodiments herein presented are not exhaustive, and further embodiments may be now known or later derived by one skilled in the art.

Figure 1:
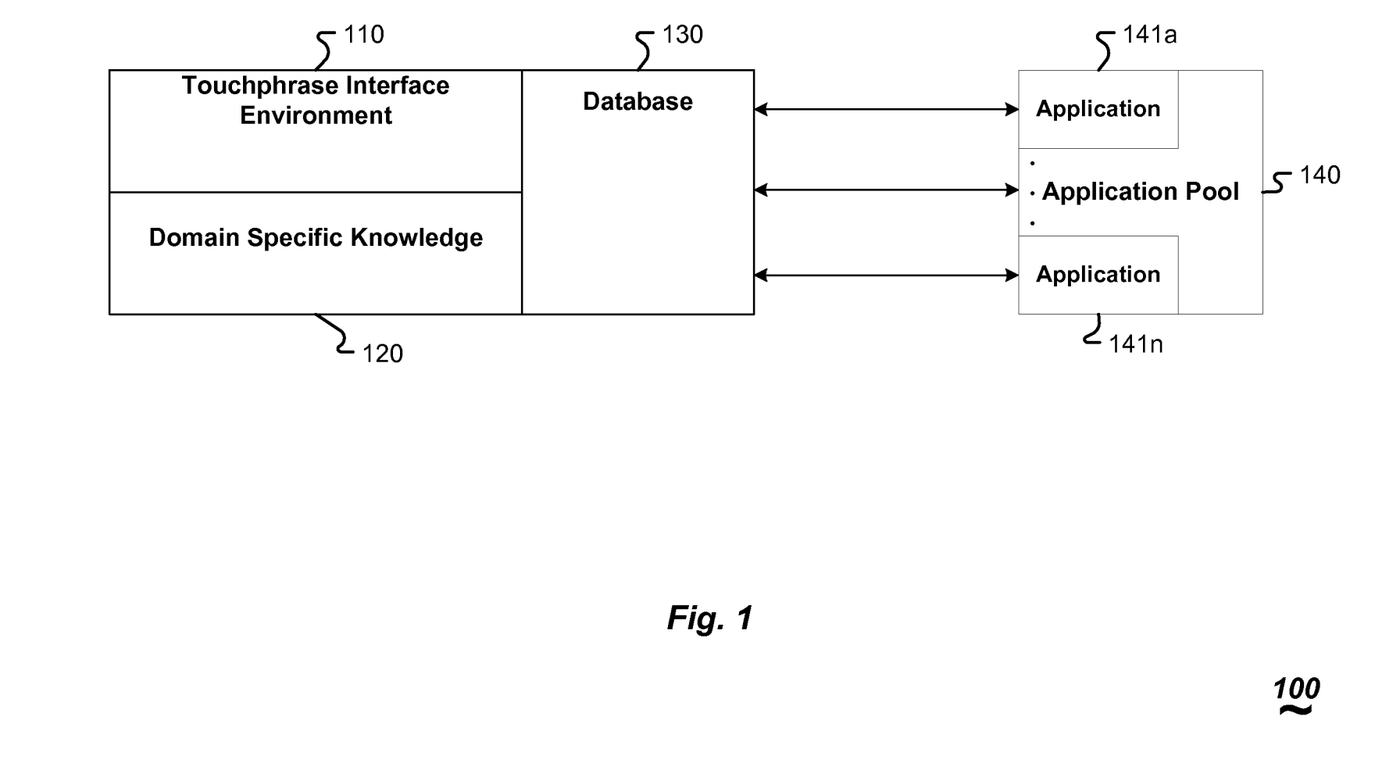
FIG. 1 shows a system according to an embodiment.

FIG. 1 shows an system 100 according to an embodiment. System 100 includes an interface environment 110, domain specific knowledge 120, and database 130. System 100 may further include application pool 140 (i.e., applications 141a-n).

Generally, the interface environment 110 includes a display and a document that contains a number of textual objects. The interface environment 110 further contains one or more data entry devices (such as touch screens, touch pads, keyboards or keypads, and others) that enter data or manipulate the textual objects.

The manner in which textual objects interact with the user depend on the underlying domain specific knowledge 120 for the document. Exemplary domain specific knowledge 120 includes fields such as medical diagnostics, financial services, legal services, automotive services, and any other domains that have a specifiable knowledge base. A user may manipulate the textual objects in the document within the field as structured by the domain specific knowledge 120. This aspect of the embodiment will be further described with respect to FIGS. 2-5.

The interface environment 110 further links the document with the objects to a database 130. In one configuration, database 130 may be a general mechanism for storage and retrieval of documents and objects within an interface environment. For example, database 130 may be a relational database or may further be a database using a looser consistency model (i.e., a NoSQL database). Generally, database 130 stores the objects in the document within the interface environment 110 according to a consistency model. The domain specific knowledge 120 may further provide a general consistency model to database 130 for storing the objects.

Application pool 140 includes a number of applications 141a-n. The applications 141a-n may access database 130 for further analysis and manipulation of the objects within the field as specified by domain specific knowledge 120 or for other applications. For example, interface environment 110 may have stored medical diagnostic inputs as objects by a diagnostic physician for a patient within a medical domain specific knowledge 120 in database 130. Another care provider for the patient may later access the medical diagnostics through application 141a for treatment purposes. A further insurance company may later access the medical diagnostics through application 141n for billing purposes.

FIGS. 2A-F show exemplary views of an interface environment 200 according to an embodiment.

Interface environment 200 includes a document 201, which includes a number of exemplary textual objects 210, 220, 230a-b, 240a-b, and 250a-b. Interface environment 200 may be output to a display. Interface environment 200 may also include input systems for a user to access and manipulate the textual objects. Input systems may include a touch-sensitive screen, a mouse-driven clickable system, and/or other input systems as known in the art. Interface environment 200 may be connected to one or more processing units (i.e., a computer) that process the inputs and outputs and further stores and retrieves data from the database 130 and the domain specific knowledge 120.

Document 201 may take up the entire interface environment 200 or may consist of only part of interface environment 200, which the interface environment 200 may include other contents (i.e., other documents related to other domains, non-documents contents such as logos). Document 201 includes a number of textual objects and may further include buttons 241a-b.

Figure 2A:
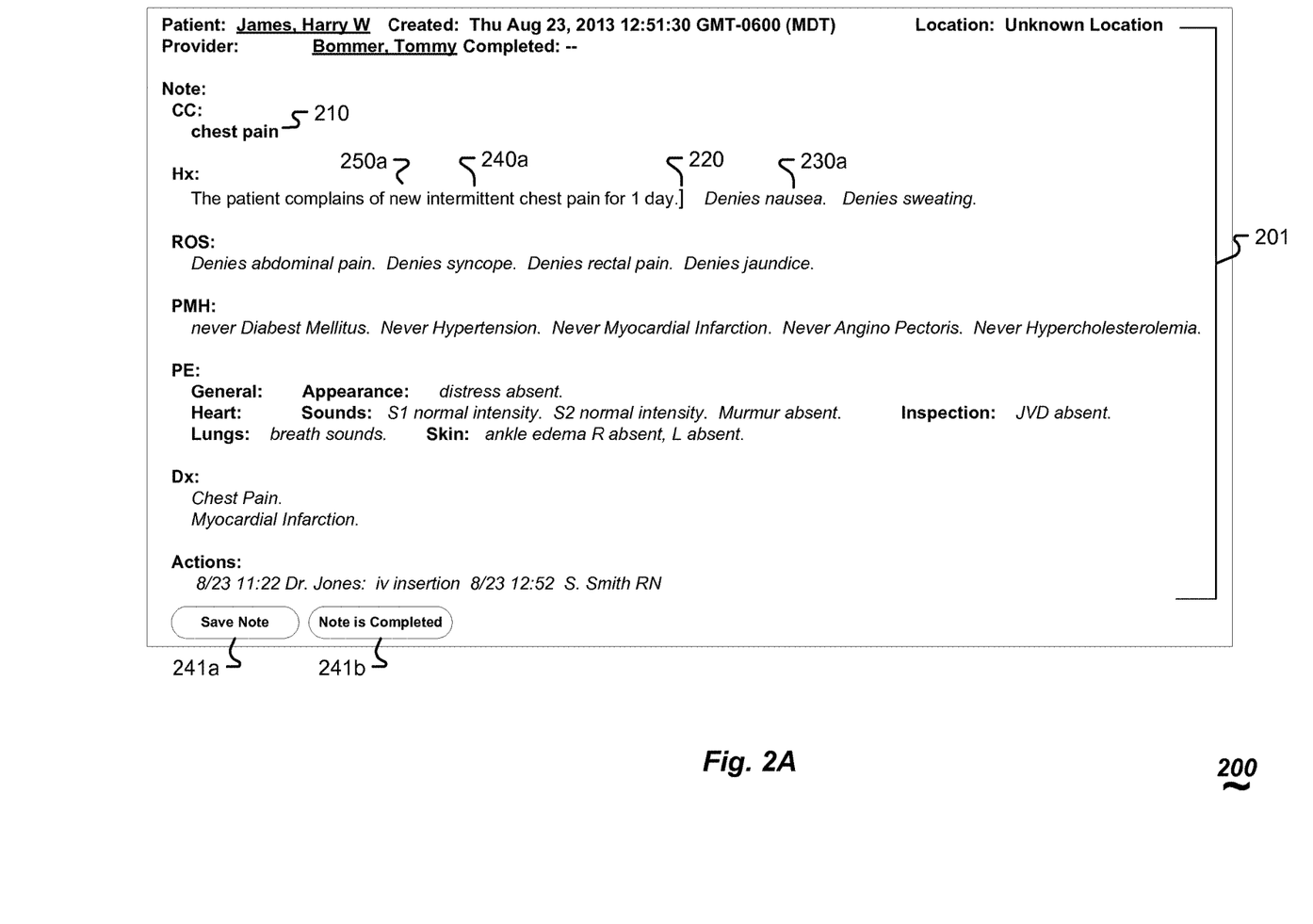
FIGS. 2A-F show exemplary views an interface environment according to an embodiment.

A textual object may be a word, phrase, symbol (i.e., icon, picture, and the like), or other representation of a contextual phrase. In one configuration, all contents (i.e., all words, phrases, texts, or other objects) within document 201 are each a textual object. Therefore, a textual object may be a single word, such as "Note:" or "PE:," or can be a sentence, such as "The patient complains of new intermittent chest pain for 1 day," or can be a phrase, such as "ankle edema R absent, L absent." The definition of a textual object may be created by the user before the application of document 201 or may be created as needed. The definition may be created with reference to the domain specific knowledge 120. textual objects may appear as normal prose or with other contextual basis.

The operation of the interface environment 200 and the textual objects will be described with reference to the exemplary textual objects 210, 220, 230a-b, 240a-b, and 250a-b. Exemplary interface environment 200 is explained with reference to medical diagnostics for a patient in the healthcare domain. In healthcare, rapid collection of complex data in a robust manner is of utmost importance because doctors, physician assistants, and nurses' time is very valuable.

Generally, the textual objects appear as text in the interface environment 200, and the user's interaction of the textual objects is editing the text by "touch" with minimal to no typing of actual text. Here, a "touch" of the user refers to a touch of a user with respect to a textual object in a touch-sensitive screen, a click for a mouse input system, or any other liked interaction that selects a textual object (i.e., a selection within the proximity of a textual object).

Medical data provides an example of complex data that needs to be stored in a database in a manner (meaningful representation) that a computer will be able to manipulate the information for further benefits. In an exemplary embodiment, a user may have selected "chest pain" as the basis of diagnostics for document 201. "Chest pain" may have been selected prior to the generation of document 201 or may be selected within document 201 as a textual object 210 under "CC:." The selection of "chest pain" may create a number of other textual objects in document 201 such as objects 220, 230a-b, 240a-b, and 250a-b. The creation of the other objects in document 201 may be defined within the domain specific knowledge 120 for "chest pain." The creation of the other objects in document 201 similar to these objects for selection of other symptoms similar to "chest pain" may also be defined within domain specific knowledge 120. Further, in one configuration, creation of the other objects in the document 201 may also occur as a side effect of actions of applications 141a-n or the application pool 140.

In one configuration, a touch on a textual object causes an action to be performed on the object (i.e., generally editing the content (text) of the object). A double touch expands an object such that more data may be entered.

Figure 2B:
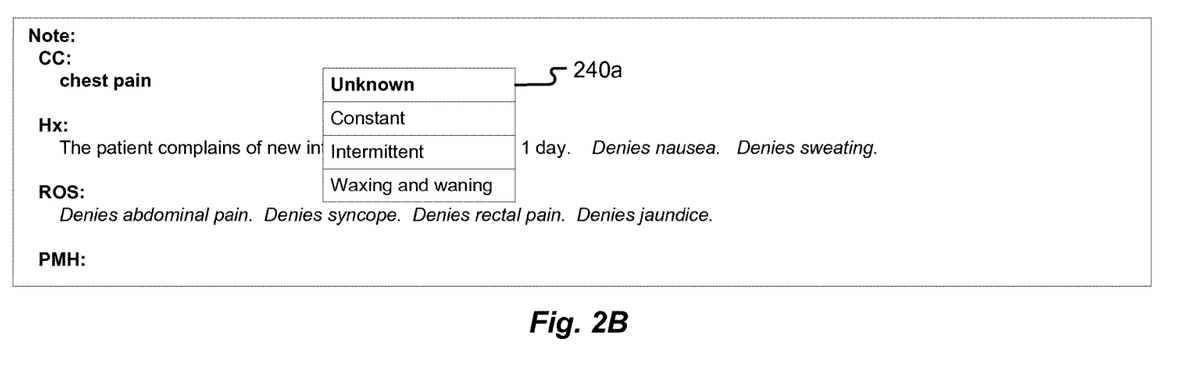
Figure 2C:
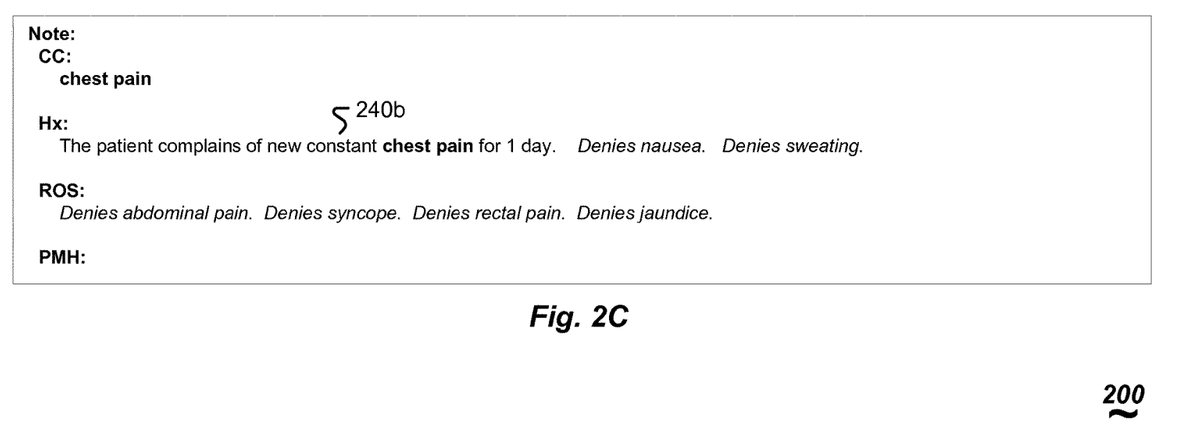

Referring to FIG. 2B, textual object 240a describes a quality of pain associated with "chest pain." Here, object 240a describes "intermittent" pain. Touching on an object brings up a menu with the possible substitutions for the object, which may be defined in a field of a database such as in domain specific knowledge 120. The user can quickly choose, and touch, on the substitution desired. Here, the substitutions for object 240a include "constant," "intermittent," and "waxing and waning." Referring to FIG. 2C, the user touched on "constant." As soon as "constant" is touched, the menu closes and the text for object 240a is updated instantly as object 240b.

Figure 2D:
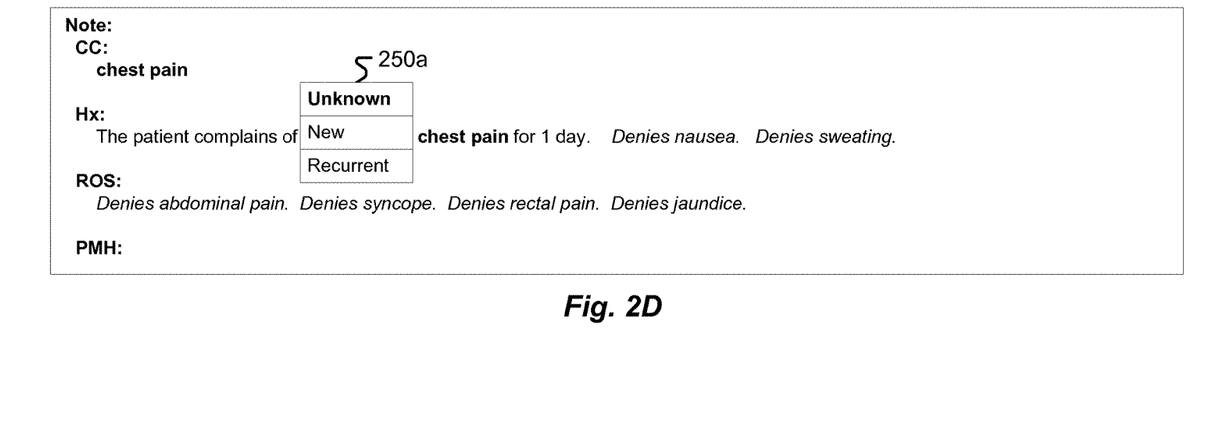
Figure 2E:
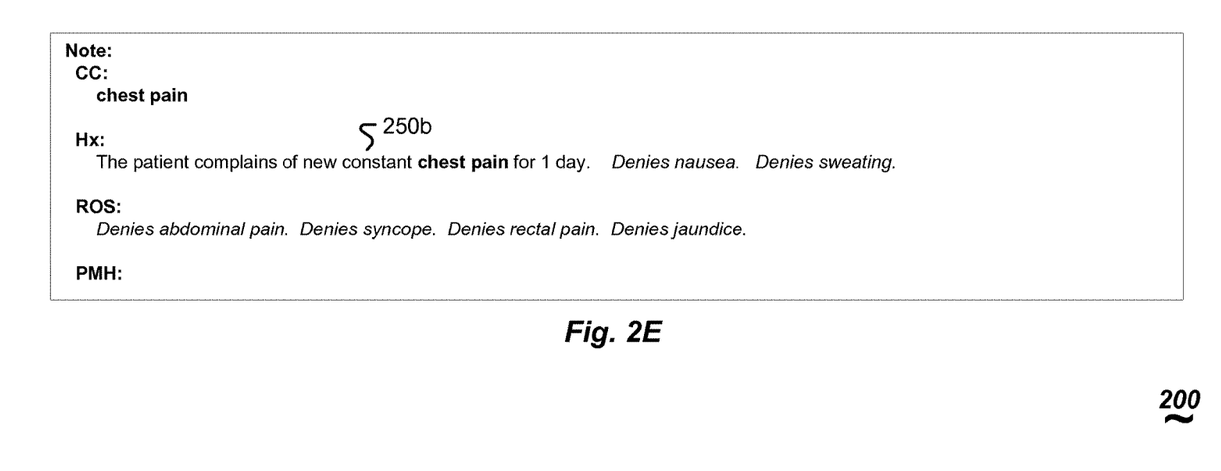

Referring to FIG. 2D, as part of a textual object is not desired or needed, perhaps with respect to a particular setting, the user may remove the object. Here, object 250a is described as "new." Touching on object 250a brings up a menu containing "Unknown," "new," and "recurrent." Referring to FIG. 2E, the user has selected "Unknown," and the object has been removed from document 201 as object 250b.

In one configuration, a textual object may have certain specific attributes as may be defined by the domain specific knowledge 120. For example, textual object 230a is shown as grayed out and italicized in document 201 at generation (through the selection of "chest pain" object 210 as described above). The grayed out and italicized object 230a may mean that the domain specific knowledge 201 may have deemed attributable to the selection of "chest pain" object 210 but would require further acknowledgment by the user. For example, in this healthcare domain, the user has not yet acknowledged that he asked the patient if they had "nausea." The acknowledged/unacknowledged attribute of a textual object would be useful in many domains with needs for an application to act as an intelligent checklist.

Figure 2F:
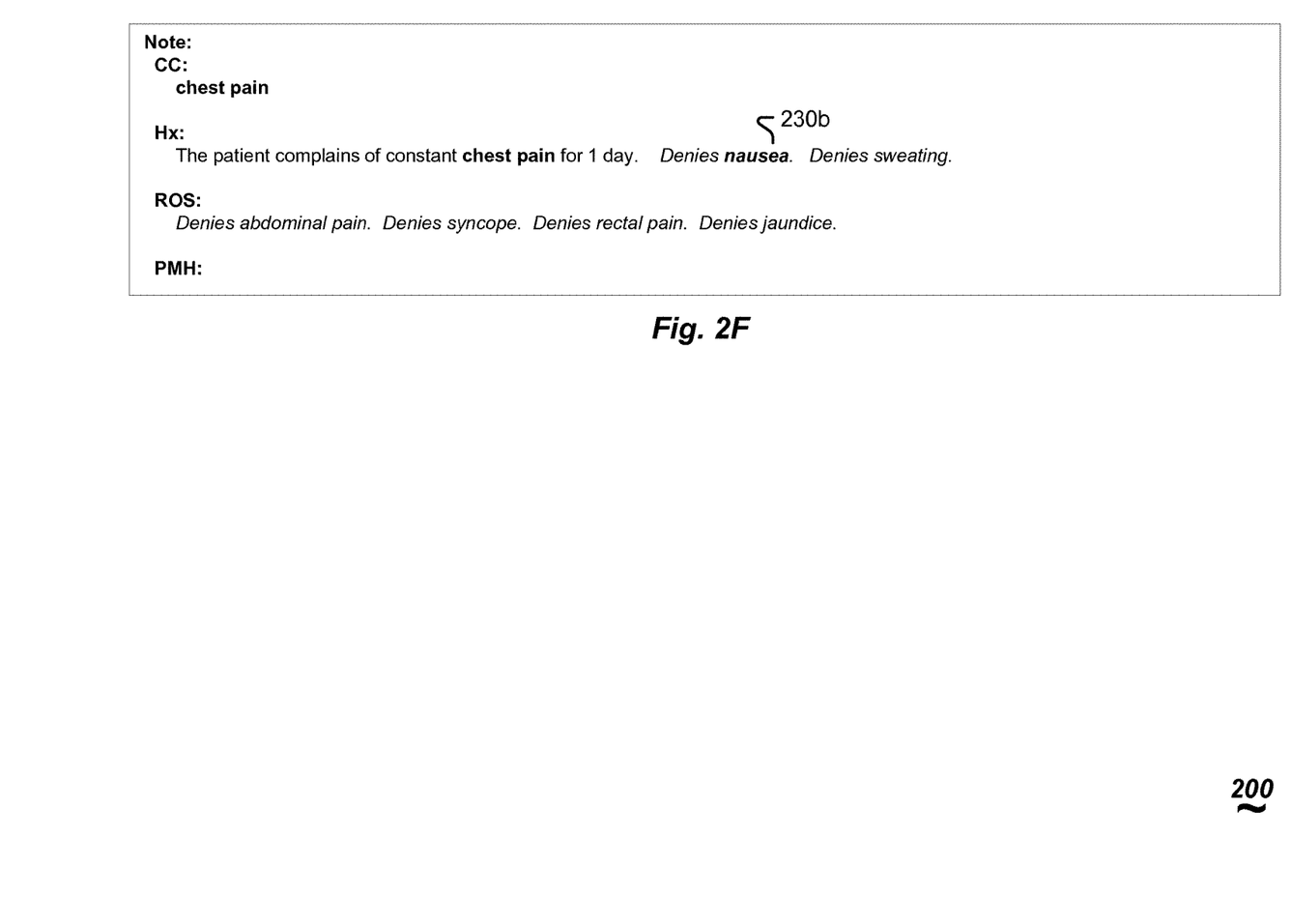

Referring to FIG. 2F, if the user asks the patient if they have nausea and the response is "no," the user may change the unacknowledged object 230a to acknowledge object 230b. In one configuration, the user may change the acknowledgement by touching on the textual object that requires acknowledgement.

Further, referring to FIG. 2A, document 201 includes buttons 241a and 241b. Here, button 241a saves the document 201 and/or the texted objects in document 201 to a database while allowing the document 201 to continue to be edited and button 241b saves the document 201 and/or the texted objects in document 201 and further indicates that the document 201 is complete and may be closed. In one configuration, after button 241b is used, unacknowledged textual objects are not considered part of the document 201 and would not be saved. For example, if object 230a remains unacknowledged by the user, object 230a is removed from document 201 when saved. In a further configuration, other means of saving the document 201 as now or later known, or derived may be used in place of or compliment to buttons 241a and 241b. For example, a save button on the display, a gesture on the interface environment 200, a keyboard shortcut (i.e., Ctrl-S), or other means may be used.

Figure 3A:
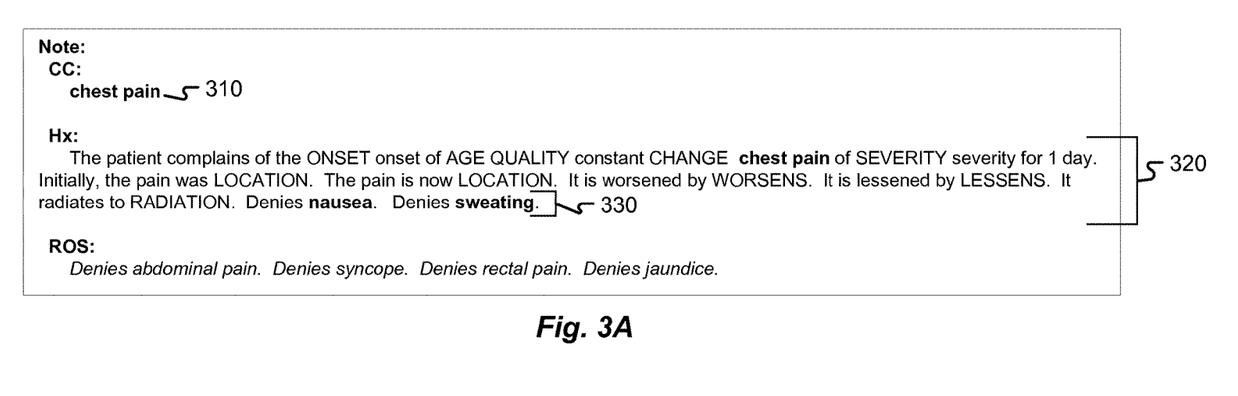
FIGS. 3A and 3B show exemplary views of an interface environment according to an embodiment.
Figure 3B:
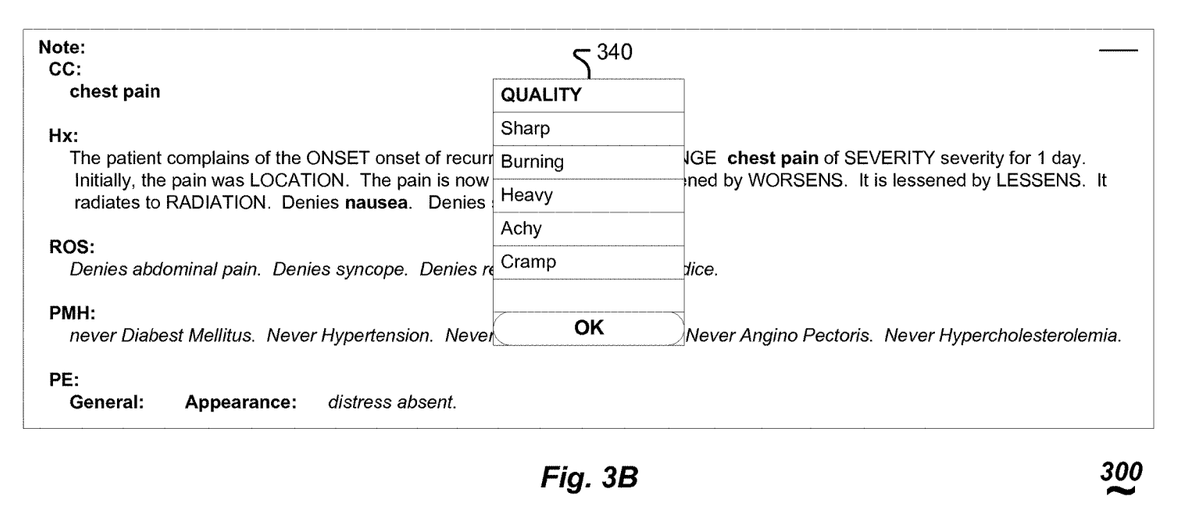

FIGS. 3A and 3B show exemplary views of a an interface environment 300 according to an embodiment.

As discussed above, in one configuration, a user may double touch on a textual object to expand the textual object in order to enter more data. Referring to FIG. 3A, double touching on "chest pain" object 310 expands to show expanded object 320.

In one configuration, expanded object 320 shows the rule in domain specific knowledge 120 for generating the additional textual objects 250a, 240a, 220, and 230a for selecting "chest pain" object 210 as discussed with respect to FIG. 2A. In FIG. 3A, expanded object 320 shows all the fields in domain specific knowledge 120 that are related to "chest pain" object 310; the fields would be additional textual objects as discussed with respect to FIG. 2A. Here, the fields do not yet hold any value as they have not been set by the user. The names of the fields are in capital letters as a visual cue to the user to indicate the user input content of the field. In one configuration, the user may double touch on the "chest pain" object 310 again to toggle back to document 201.

In one configuration, the expanded object 320 may be shown in a different color from normal textual objects to differentiate expanded objects from textual objects. Further, the color coding also helps delineate the beginning and ending of a textual object.

In one configuration, a user may edit expanded object 320 to change the contents of a field. For example, referring to FIG. 3B, a user may edit the "quality" field by touching on the field. This may bring up an appropriate menu 340 showing the selectable contents for the field (i.e., "sharp," "burning," "heavy," "achy," and "crampy") as defined in domain specific knowledge 120. Here, the user may select one or more of the selectable content or may enter a custom content for that field. The selected or entered content may then appear as the content for the respective textual object. In one configuration, a user may save the selected or entered content as a default for that field or may add the entered content as a selectable content for that field. As such, the user may edit the domain specific knowledge 120 through editing fields in expanded object 320.

In one configuration, expanded object 320 shows all fields including fields for objects that are turned off (i.e., "unknown" object 250a). As such, expanded object 320 serves as another interface tool for users to enter data and correct mistakes from directly interacting with textual objects as described with respect to FIG. 2.

Figure 4A:
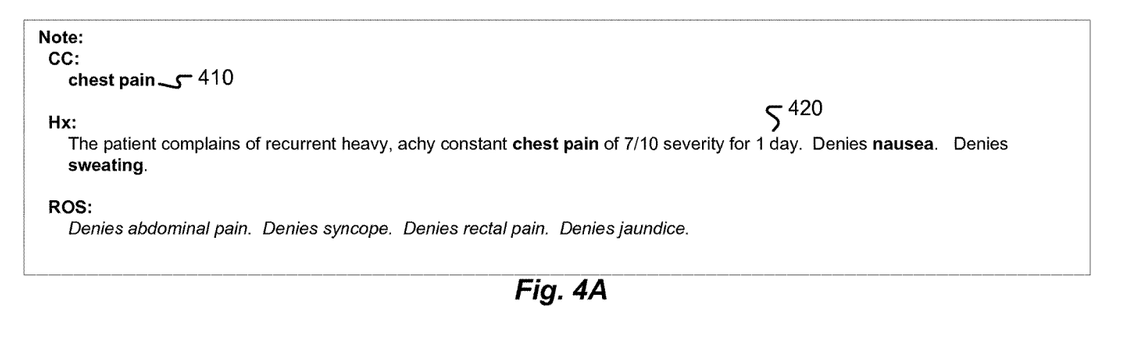
FIGS. 4A and 4B show exemplary views of an interface environment according to an embodiment.
Figure 4B:
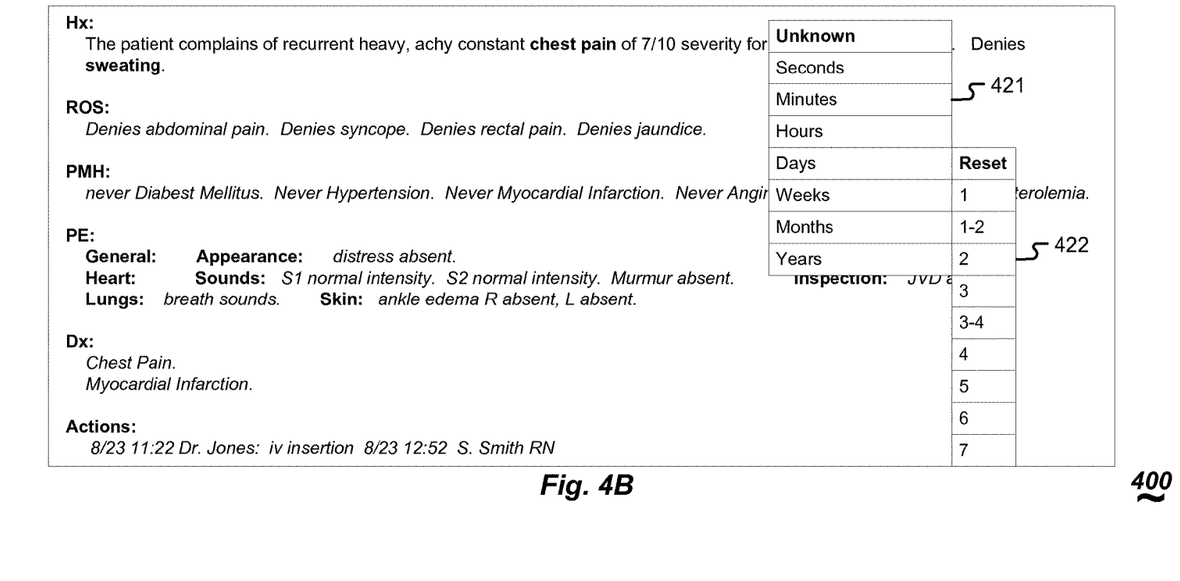

FIGS. 4A and 4B show exemplary views of an interface environment 400 according to an embodiment.

Selecting textual object 410 for "chest pain" generates textual object 420 describing the duration of the pain and defaults to "1 day." Object 420 may be a hierarchical object representing two or more contents each with their own set of selectable values. For example, referring to FIG. 4B, object 420 includes contents for a duration measurement 421 (i.e., "seconds," "minutes," "hours," "days," "weeks," "months," and "years") and a value for that duration measurement 422. Further, the user's selection in the first content (duration measurement 421) may affect the selections available to be selected in the second content (value for the duration measurement 422). For example, a duration measurement 421 of "days" may render a value 422 of "1" to "7" being selectable; other values such as "1-2" or "3-4" (days) may be further selectable depending on the need of the domain as defined by the domain specific knowledge 120. A duration measurement 421 of "months" may render a value 422 of "1" to "12" being selectable. Again, this is all dependent on the domain specific knowledge 120 with the goal of speeding up user data entry.

Figure 4C:
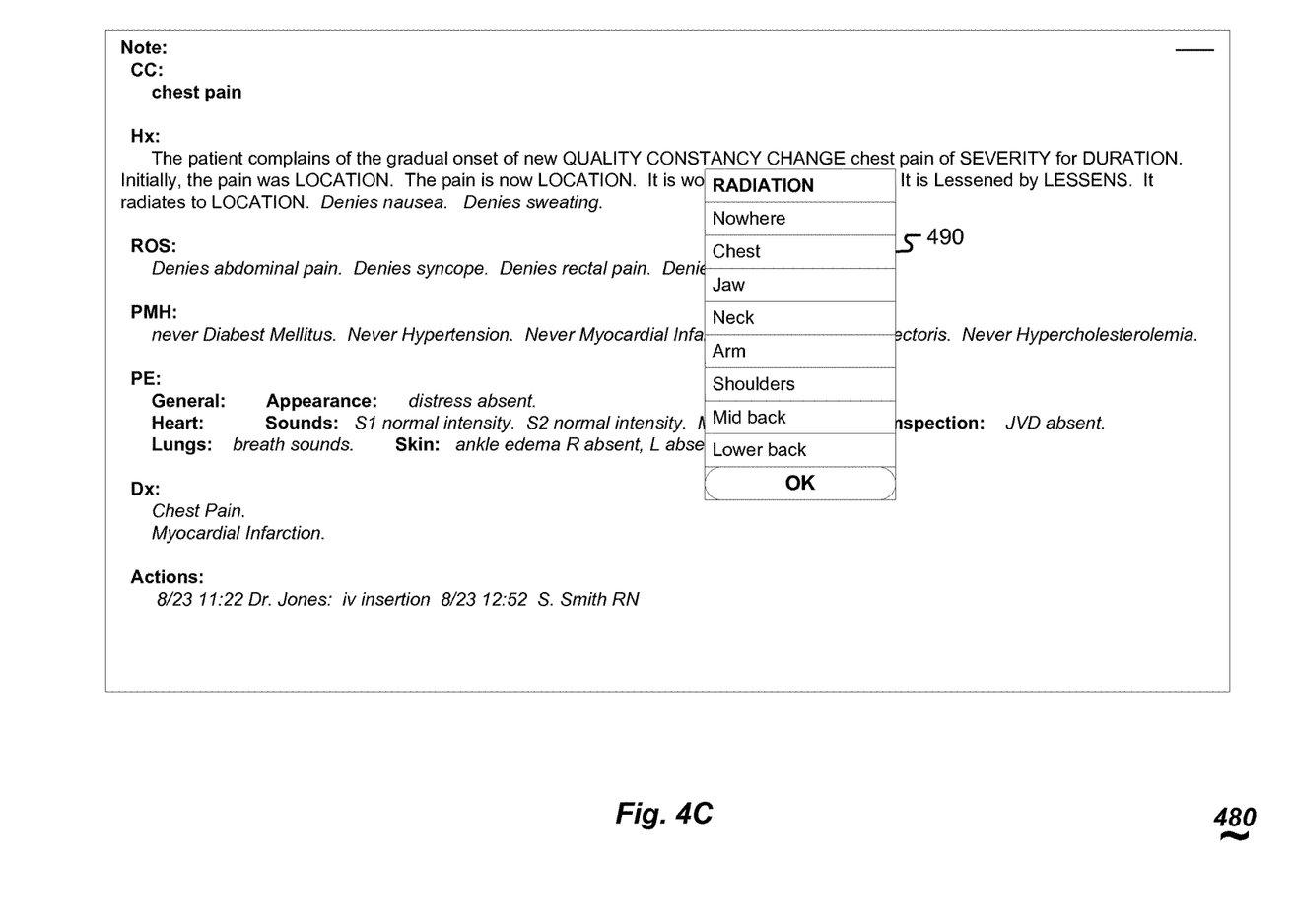
FIG. 4C shows an exemplary view of an interface environment according to an embodiment.

FIG. 4C shows an exemplary view of an interface environment 480 according to an embodiment.

Textual object 490 for "radiation location" includes a number of selectable content ("nowhere," "chest," "jaw," "neck," "arm," "shoulders," "mid back," and "lower back") as defined in the domain specific knowledge 120. In one configuration, a user may select one or more of the selectable content for object 490. For example, a user may select both "chest" and "jaw" for object 490 if both locations are applicable as a "radiation location." As such, textual object 490 may support a choose many content. A user may quickly enter the multiple content for object 490 using the corresponding menu by touching on a plurality of selections.

In one configuration, the choose many menu may be combined with the hierarchical menu as discussed with respect to FIGS. 4A and 4B above. For example, each of the selected choose many content may correspond to further hierarchical menus. Here, a "chest" selection for object 490 may render a further menu with selections "left" or "right." A "jaw" selection for object 490 may render a further menu with selections that include "bilateral." A user choosing multiple contents "chest" and "jaw" for object 490 and choosing "right" in the hierarchical menu for "chest" and "bilateral" for "jaw" may result in "it radiates to right chest, bilateral jaw" as displayed in the document for textual object 490.

In one configuration, the menu used to enter content for object 490 may also be an exclusive-or (XOR) menu. In an XOR menu, the selection of one menu item (content) will exclude the ability to select some other menu items (contents). For example, for object 490, "nowhere" is exclusive of all other body locations; as such, the selection of "nowhere" will exclude the selections of any other content for object 490 as defined in the domain specific knowledge 120.

In operation, the XOR menu has an effect of flexibility in defining menus in the domain specific knowledge while allowing for greater speed, intuitiveness, and user efficiency. For example, in a scenario where both "chest" and "jaw" have been selected, a user selecting "nowhere" will automatically deselect both "chest" and "jaw" as "nowhere" is exclusive of all other content; as such, this allows for quick entry of information consistent with the domain specific knowledge and consistent with the operation of the embodiment of the invention.

It is further noted that the different types of menus may be constructed and combined as needed. In the exemplary configurations as described, the choose one, choose many, hierarchical, and the XOR menu is used. Other menus may also be used as now known or be later derived.

Figure 5A:
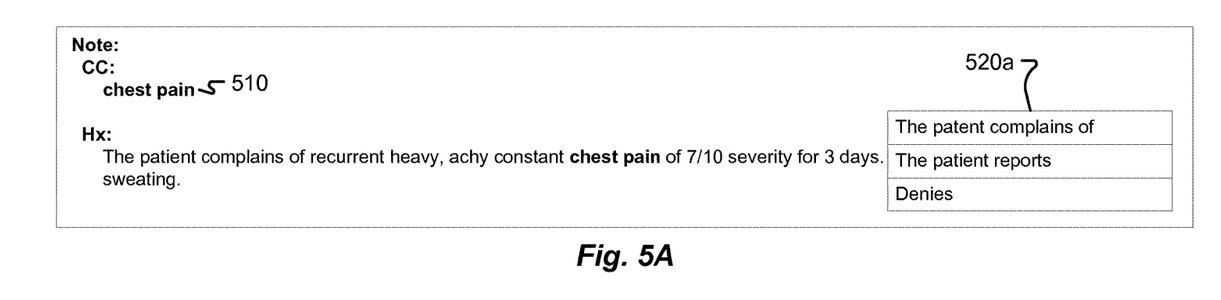
FIGS. 5A and 5B show exemplary views of an interface environment according to an embodiment.
Figure 5B:
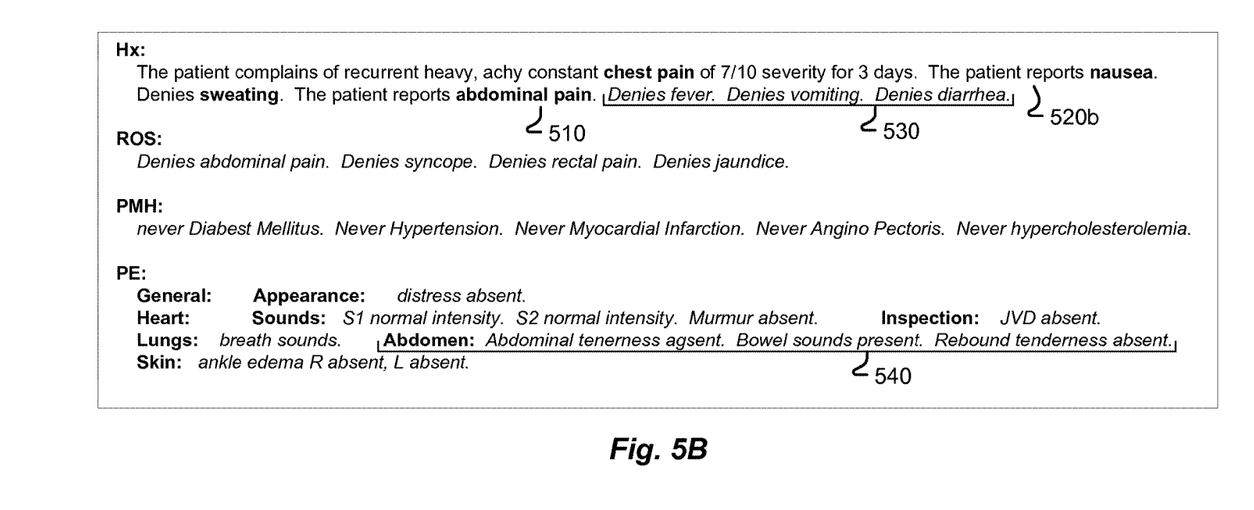

FIGS. 5A and 5B show exemplary views of an interface environment 500 according to an embodiment.

As discussed previously, a textual object 510 may generate an additional textual object 520a that requires further acknowledgement by the user (i.e., acknowledgement "denies" by a patient). Here, the content of "denies" object 520a may be further changed to "the patient complains of" or "the patient reports." As such, the acknowledgement of object 520a has been changed from a negative subject (where the patient denies the subject) to a positive subject in object 520b.

Referring to FIG. 5B, the acknowledgement of object 530 where "the patient reports abdominal pain" may also create further textual objects 530 (i.e., "denies fever," "denies vomiting," and "denies diarrhea"). Here, objects 530 are objects that require further acknowledgement by the user. The acknowledgement of object 530 may also add new textual objects 540 in other sections of the document. Here, objects 540 are added to the "PE" section to ask the user to document other diagnosis related to the "abdomen." Since the patient does in fact report abdominal pain, then it is likely the user will want to, or should, document an abdominal exam of the patient.

Therefore, extending from the checklist behavior of textual objects as previously discussed, the acknowledgement of an object may bring further objects that may warrant the user's attention to the checklist. Thus, this intelligent checklist behavior further speeds up the user's input (the user does not have to create a new textual object on his own as they are presented to him automatically) and reminds the user of items that are perhaps important to the document.

Figure 6:
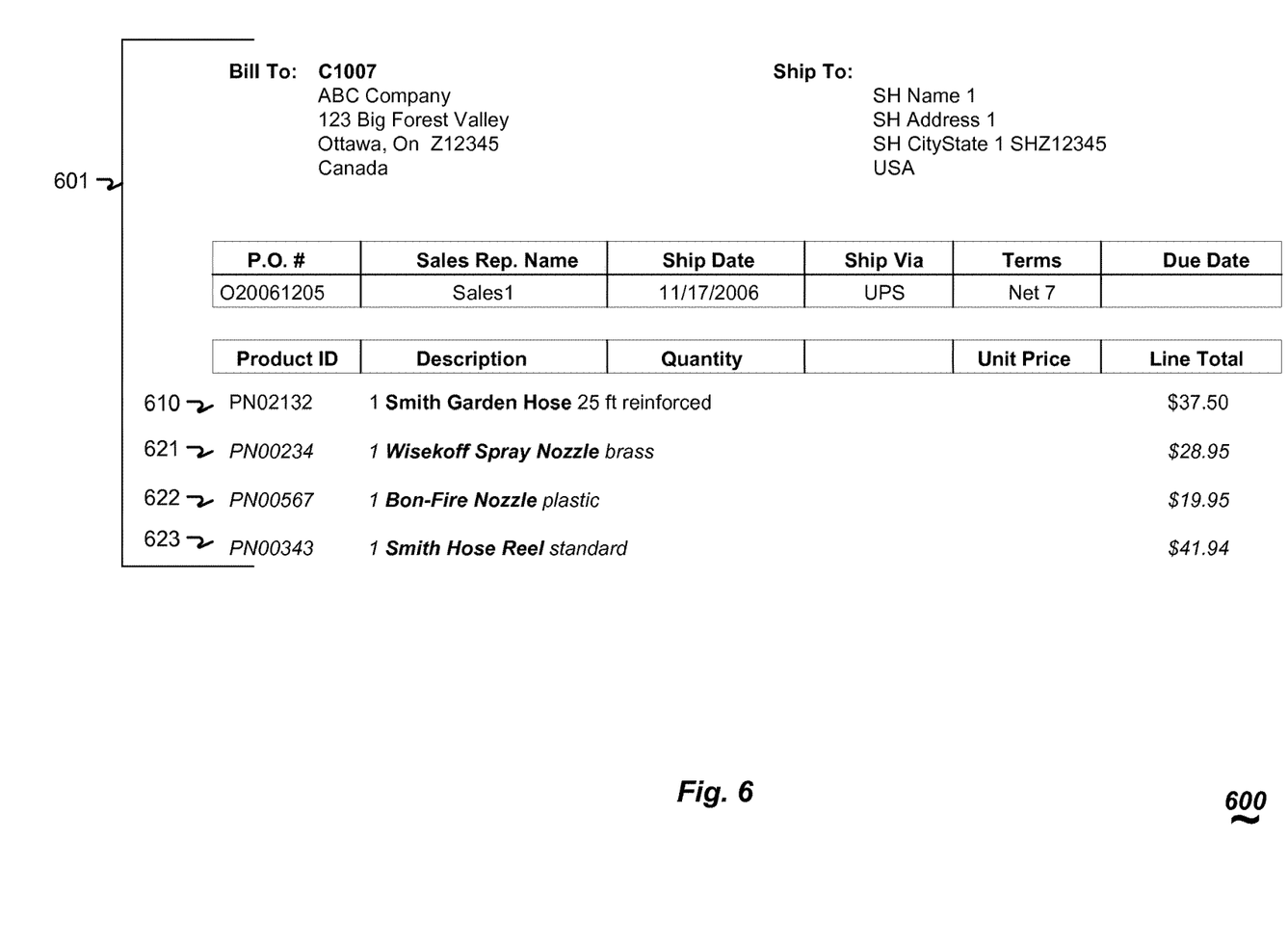
FIG. 6 shows an exemplary view of a interface environment according to an embodiment.

FIG. 6 shows an exemplary view of a interface environment 600 according to an embodiment.

As discussed previously, the interface environment is applicable to any domain specific knowledge. Document 601 is a point-of-sale application in an interface environment with exemplary textual objects 610, 621, 622, and 623, which have contents of the respective product ids for a product within the domain specific knowledge. Here, document 601 illustrates the checklist functionality of the interface environment as applicable to a point-of sale application. When object 610 is changed to enter the purchase of a garden hose by the clerk, other objects 621, 622, and 623 may be added as checklist items that require further acknowledgement by the user. For example, the domain specific knowledge may deem that the products represented by objects 621, 622, and 623 be of interest to those that purchase the garden hose represented by object 610.

In another example, the interface environment may be applicable to a car maintenance application. Here, a user may use a textual object to quickly enter the number of quarts of oil required for an oil change. A hierarchical may be used to represent the combination of oil type used (i.e., a combination of "5 W," "10 W," and "20," "30," "40").

The exemplary systems and methods of this disclosure have been described in relation to the interface environment. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. In one aspect, applications $141a$-$n$ or the application pool $140$ may further offer suggestions, actions, or information to the user.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for an interface environment, comprising:
computational equipment including a processor for generating a data representation of a document for display on a screen, the data representation including a plurality of contextual objects corresponding to information objects within the document, wherein each contextual object is based on a mapping of a definition in a domain specific knowledge;
a screen for presenting at least a portion of the data representation that corresponds to a continuous portion of the document and
an input device, wherein the input device receives an input corresponding to a location of the screen proximate to a selected contextual object of the contextual objects in the data representation, wherein the display further presents a plurality of selectable contents defined in the domain specific knowledge for the selected contextual object at a location proximate to the location of the input, wherein the input device further receives a selection input for selecting one content of the selectable contents, and wherein the display further presents a change of a content of the selected contextual object based on the one content, wherein
the selected contextual object comprises contextual text that corresponds to a text of the document.

2. The system of claim 1, further comprising a storage for storing at least one of the document and the contextual objects in a database.

3. The system of claim 2, wherein the storing is activated by a user interaction with one or more buttons displayed on the screen.

4. The system of claim 1, wherein at least one of the contextual objects is unacknowledged, and wherein the unacknowledged contextual object is acknowledged responsive to an input of the user.

5. The system of claim 1, wherein the document further comprises one or more expanded objects describing the domain specific knowledge for at least one contextual object and other related contextual objects.

6. The system of claim 1, wherein the content of the contextual object includes two or more selectable contents defined in and mapped to the domain specific knowledge.

7. The system of claim 1, wherein the content of the context object excludes one or more selectable contents defined in the domain specific knowledge based on the selection of one selectable content defined in and mapped to the domain specific knowledge.

8. The system of claim 1, wherein the content of one or more contextual objects comprises one or more hierarchical levels, and wherein the changed content of one level of the hierarchical levels affects the mapped contents to the domain specific knowledge of one or more other levels of the hierarchical levels.

9. The system of claim 4, further comprising a storage for storing at least one of the document and the contextual objects in a database, wherein each unacknowledged contextual object is excluded from the document or the contextual objects stored in the database.

10. The system of claim 2, wherein the document or the contextual objects stored in the database are configured to be accessed by one or more external applications.

11. A method of presenting and capturing information in an interface environment, comprising:
generating, using computational equipment including a processor, a data representation of a document for display on a screen, the data representation including a plurality of contextual objects corresponding to information objects within the document, wherein each contextual object is based on a mapping of a definition in a domain specific knowledge;
presenting at least a portion of the data representation that corresponds to a continuous portion of the document on the screen;
responsive to an input of a user corresponding to a location of the screen proximate to a selected contextual object of the contextual objects in the data representation, presenting a plurality of selectable contents defined in the domain specific knowledge for the contextual object at a location proximate to the location of the selection input;
responsive to a selection input of the user for selecting one of the selectable contents, changing a content of the selected contextual object and at least one of adding to and removing from the document one or more other contextual objects in accordance with the content of the selected contextual object mapped to a relational definition in the domain specific knowledge for the selected contextual object and the one or more other contextual objects; and
storing at least one of the document and the contextual objects to a database, wherein
the selected contextual object comprises contextual text that corresponds to a text of the document.

12. The method of claim 11, wherein the selected contextual object is configured to be acknowledged or unacknowledged by the user, and wherein an unacknowledged contextual object is not stored to the database.

13. The method of claim 11, wherein the content of the selected contextual object comprises one or more hierarchical levels, and wherein the changed content of one level of the hierarchical levels affects the mapped contents to the domain specific knowledge of one or more other levels of the hierarchical levels.

14. The method of claim 11, wherein the domain specific knowledge comprises knowledge relating to medical diagnostics.

15. The method of claim 11, wherein the text comprises a phrase.

16. The method of claim 11, wherein the document comprises one or more paragraphs.

17. A method of presenting and capturing information in an interface environment, comprising:
generating, using computational equipment including a processor, a data representation of a document for display on a screen, the data representation including a plurality of contextual objects corresponding to information objects within the document, wherein each contextual object is based on a mapping of a definition in a domain specific knowledge;
presenting at least a portion of the data representation that corresponds to a continuous portion of the document on the screen;

responsive to an input of a user corresponding to a location of the screen proximate to a selected contextual object of the contextual objects in the data representation, presenting a plurality of selectable contents defined in the domain specific knowledge for the contextual object at a location proximate to the location of the selection input;

responsive to a selection input of the user for selecting one content of the selectable contents, changing a content of the selected contextual object based on the one content; and storing at least one of the document and the contextual objects to a database, wherein the selected contextual object comprises contextual text that corresponds to a text of the document.

18. The method of claim 17, wherein the domain specific knowledge comprises knowledge relating to medical diagnostics.

19. The method of claim 17, wherein the document comprises one or more paragraphs.

20. The system of claim 1, wherein the domain specific knowledge comprises knowledge relating to medical diagnostics.

21. A non-transitory computer-readable medium comprising processor executable instructions for performing the method of claim 11.

22. A non-transitory computer-readable medium comprising processor executable instructions for performing the method of claim 17.

* * * * *

UNITED STATES PATENT AND TRADEMARK OFFICE
CERTIFICATE OF CORRECTION

PATENT NO. : 10,175,844 B2
APPLICATION NO. : 14/423497
DATED : January 8, 2019
INVENTOR(S) : Ricky Steven Pionkowski Page 1 of 1

It is certified that error appears in the above-identified patent and that said Letters Patent is hereby corrected as shown below:

In the Claims

Claim 1, Column 13, Lines 22-23, please delete "portion of the document and" and insert --portion of the document; and--

Signed and Sealed this
Thirtieth Day of July, 2019

Andrei Iancu
*Director of the United States Patent and Trademark Office*